No. 672,320. Patented Apr. 16, 1901.
R. E. FORD.
COUNTERBALANCE.
(Application filed Dec. 13, 1899.)
(No Model.) 2 Sheets—Sheet 1.

OLD CONSTRUCTION

OLD CONSTRUCTION.

WITNESSES:
Donn Twitchell
Geo. G. Hosted

INVENTOR
Robert E. Ford
BY
Munn
ATTORNEYS

No. 672,320. Patented Apr. 16, 1901.
R. E. FORD.
COUNTERBALANCE.
(Application filed Dec. 13, 1899.)
(No Model.)
2 Sheets—Sheet 2.

WITNESSES:

INVENTOR
Robert E. Ford
ATTORNEYS

UNITED STATES PATENT OFFICE.

ROBERT EDGAR FORD, OF PASADENA, CALIFORNIA.

COUNTERBALANCE.

SPECIFICATION forming part of Letters Patent No. 672,320, dated April 16, 1901.

Application filed December 13, 1899. Serial No. 740,201. (No model.)

*To all whom it may concern:*

Be it known that I, ROBERT EDGAR FORD, a citizen of the United States, residing at Pasadena, in the county of Los Angeles and State of California, have invented a new and Improved Counterbalance, of which the following is a full, clear, and exact description.

The invention relates to machines having reciprocating and revolving parts, especially such machines in which reciprocating is converted into rotary motion, or vice versa; and the object of the invention is to provide a new and improved counterbalance for convenient attachment to the machines and arranged to perfectly counterbalance the working parts, to avoid vibration and undue friction, and insure a full utilization and transmission of the motive power employed.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1:
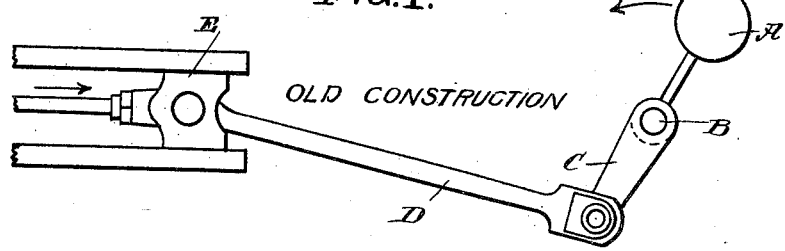
Figure 2:
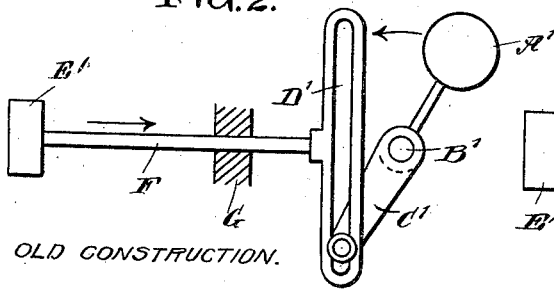
Figure 3:
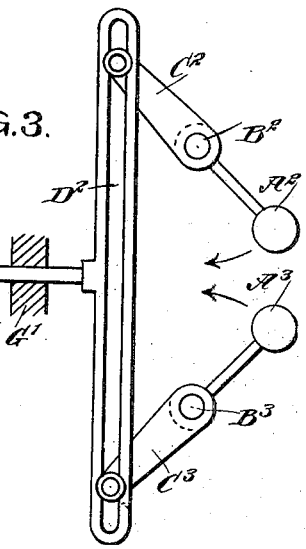
Figure 4:
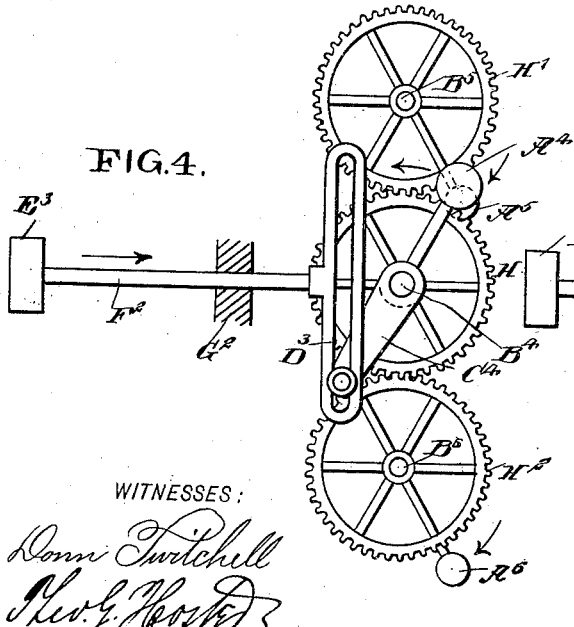
Figure 5:
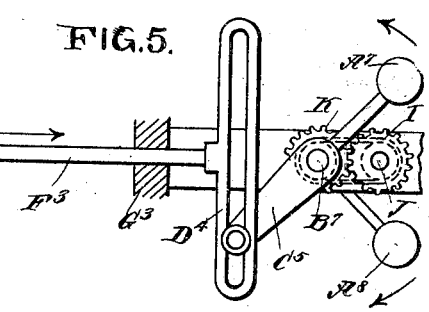
Figure 6:
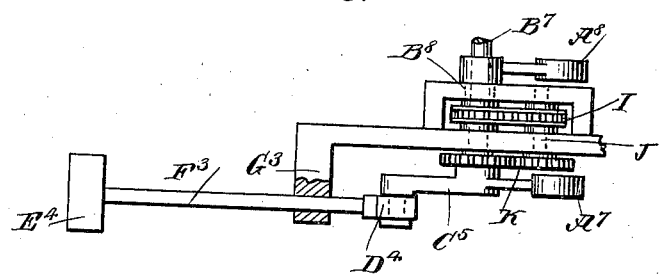
Figure 7:
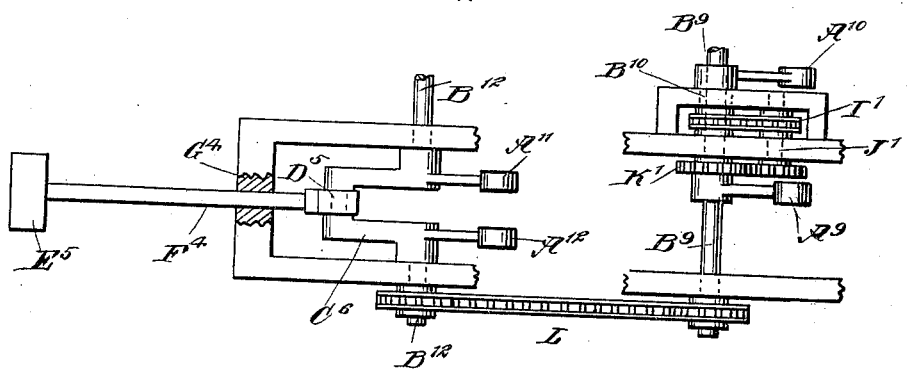

Figure 1 is a side elevation of the ordinary form of counterbalance. Fig. 2 is a similar view of another form of the same. Fig. 3 is a like view of the improved counterbalance. Figs. 4 and 5 are similar views of modified forms of the improvement with parts in section. Fig. 6 is a plan view of the modified form shown in Fig 5, and Fig. 7 is a like view of another modified form of the improvement.

In the counterbalances heretofore employed (see Figs. 1 and 2) the horizontal forces are the only ones that are balanced, while the vertical forces remain unbalanced, or vice versa, and consequently a perfect balance was heretofore impossible. For instance, as illustrated in Fig. 1, the counterbalance consists of a body A, preferably in the shape of a ball on the end of an arm secured to a revolving shaft B, on which is secured a crank-arm C, connected by a pitman D with a crosshead E, mounted to reciprocate in suitable guideways and connected in the usual manner with the piston of the engine, pump, or other machine. The body A is arranged diametrically opposite the crank-arm C, and the center-of-gravity radius of the body is shown as equal to the crank-pin radius, and said body has a mass to correspond to the total mass of the reciprocating and revolving parts, so that the horizontal forces are balanced when the machine is in motion, but the vertical forces remain unbalanced. As illustrated in Fig. 2, the body A' is similarly arranged relatively to the shaft B' and the crank-arm C' thereon, but the latter is connected by a vertically-slotted link D' with a rod F, mounted to slide in a bearing G and connected with a weight E', representing the total mass of the reciprocating parts. The body A' has its center-of-gravity radius equal to the wrist-pin radius of the crank-arm C', and the mass of said body is equal to the total mass of the reciprocating parts and the revolving parts, thus counterbalancing the horizontal forces, but not the vertical forces.

Now the principal feature of my invention consists in counterbalancing both the horizontal and the vertical forces of the machine by the use of a plurality of counterbalancing-bodies arranged to move in unison relative to one another and to counterbalance each other in a vertical direction and to revolve in unison with the revolving parts of the machine, the bodies having an aggregate mass and center-of-gravity radius such that the product shall be equal to the product of the mass of the reciprocating parts and the crank radius. This essential feature may be brought out in various forms. For instance, as shown in Figs. 3 and 5, I employ a plurality of bodies—for instance, two bodies or three bodies, as shown in Fig. 4. In the form shown in Fig. 3 the bodies $A^2$ and $A^3$ are carried by shafts $B^2$ $B^3$, respectively, having crank-arms $C^2$ $C^3$, connected with a slotted link $D^2$ on a rod F', mounted to slide in a bearing G' and connected with the body $E^2$, which represents the aggregate mass of the reciprocating parts. The bodies $A^2$ $A^3$ extend diametrically opposite to the crank-arms $C^2$ $C^3$, and the latter are so connected with the link $D^2$ that when the machine is in motion the two bodies $A^2$ $A^3$ will revolve in opposite directions, as indicated by the arrows, and as the said bodies are alike in mass and aggregate a mass or weight equal to the total mass of the reciprocating parts (the center-of-gravity radius of each body being considered equal to the crank radius) it is evident that they counterbalance the working parts horizontally and each other in a vertical direction.

It is understood that the force of any unbalanced revolving parts is counterbalanced by a suitable portion of the counterweight that revolves with it. As shown in Fig. 4, a portion of the main body $A^4$ counterbalances the attached revolving parts of the machine, and the remainder of the main body is equal in mass to the aggregate masses of the bodies $A^5 A^6$, which in turn are alike in mass, and said main body $A^4$ is carried by a shaft $B^4$, having a crank-arm $C^4$, connected with a slotted link $D^3$, attached to the rod $F^2$, mounted to slide in a bearing $G^2$ and connected with the body $E^3$, representing the aggregate mass of the reciprocating parts. The bodies $A^5 A^6$ are carried by shafts $B^5 B^6$, and the latter are rotated from the main shaft $B^4$ by gear-wheels H, H', and $H^2$, as is plainly shown in the drawings. The body $A^4$ is so arranged relatively to the bodies $A^5 A^6$ that the latter rotate in an opposite direction to that of the body $A^4$, and the bodies pass the dead-center of the crank-arm $C^4$ at the same time, and the said bodies counterbalance the reciprocating parts in a horizontal direction and counterbalance each other in a vertical direction.

As shown in Figs. 5 and 6, two bodies $A^7 A^8$ are arranged on separate shafts $B^7 B^8$, of which the shaft $B^7$ is connected by the crank-arm $C^5$ with the link $D^4$, connected by the rod $F^3$ with the body $E^4$, representing the aggregate mass of the reciprocating parts, said rod $F^3$ being mounted to slide in a bearing $G^3$. The shaft $B^8$, previously mentioned, is hollow to receive the shaft $B^7$ and is connected by a sprocket-chain and sprocket-wheels I with an auxiliary shaft J, and the latter is driven by gear-wheels K from the shaft $B^7$, so that the shafts $B^7 B^8$ rotate in unison, the body $A^7$ being arranged diametrically opposite the crank-arm $C^5$. By the arrangement described a proper portion of the body $A^7$ counterbalances the attached revolving parts, while the remainder of the body $A^7$ and the body $A^8$ counterbalance each other in a vertical direction and together counterbalance the reciprocating parts in a horizontal direction, and said bodies rotate at the same rate of speed and pass the dead-center of the crank at the same time. The arrangement shown in Fig. 6 may be duplicated on the other end of the crank-pin, provided that the aggregate masses, when subdivided, remain the same as before. This arrangement will be necessary in practice to avoid the sluing tendency of the body $A^8$, which is shown as being far removed from the line of the reciprocating motion.

In the modified form shown in Fig. 7 two bodies $A^9$ and $A^{10}$ are arranged on separate shafts $B^9$ and $B^{10}$, respectively, the same as shown in Figs. 5 and 6 and described above, and one, two, or more bodies $A^{11}$ and $A^{12}$ are arranged diametrically opposite the crank-arm $C^6$, connected with the link $D^5$, attached to the rod $F^4$, mounted to slide in a bearing $G^4$ and connected with the body $E^5$, representing the aggregate mass of the reciprocating parts. The main shaft $B^{12}$, carrying the crank-arm $C^6$, is connected by sprocket wheels and chain L with the shaft $B^9$, so that the rotary motion of the main shaft is transmitted by the sprocket-gearing L to the shaft $B^9$, and the motion of the latter is transmitted to the hollow shaft $B^{10}$ by the gearing K', the shaft J', and the sprocket-gear I'. Now the bodies $A^{11}$ and $A^{12}$ balance the revolving parts, while the body $A^9$ is equal to the body $A^{10}$, and the aggregate mass of the bodies $A^9$ and $A^{10}$ corresponds to the total mass of the reciprocating parts represented by $E^5$. The right-hand device may be located anywhere in the line of the reciprocating parts and may have the bodies subdivided as may be convenient and as before stated in reference to Figs. 5 and 6 and may also take the form shown in Figs. 3 and 4. The principle brought out by Fig. 7 is that the device may be an entirely separate mechanism from the main machine, it only being required that the resultant action shall be in the line of the reciprocating motion.

Throughout this description the mass of all bodies is considered as concentrated in a single point, as the center of gravity, and in revolving bodies the distance of this point from the axis of rotation is designated as the "center-of-gravity radius."

In the several cases described the center-of-gravity radius of the bodies is considered as equal to that of the wrist-pin of the crank or that of the point where the reciprocating parts are connected with the revolving parts; but it is evident that a different proportion may be selected and the mass of the body or bodies increased or decreased accordingly. It is further understood that other means may be employed for imparting the necessary motion to the different bodies as long as the bodies of a device travel at the same rate of speed and in the required direction.

From the foregoing it is evident that the unbalanced rotating parts, if any, will be balanced by a proper portion of the main counterbalancing-bodies, and the unbalanced effect of the reciprocating parts in the line of their motion is balanced one half by the proper portion of the main balancing-body and the other half by the auxiliary counterbalancing-body because all these counterbalancing-bodies have the same speed in the line in which the reciprocating parts move and said bodies move in opposite directions. It will be seen that the otherwise unbalanced forces of the various counterbalancing-bodies in the line perpendicular to the line of the reciprocating motion are balanced among themselves because there are equal unbalanced masses in the main and auxiliary bodies that move at the same speed in opposite directions. As all the forces in any plane may be resolved into components in directions at right angles to each other, and since the various counterbalancing-bodies may be so disposed as to be symmetrical in location and action as regards this plane and, furthermore, may be symmetrically disposed about the line of motion of the reciprocating parts, it is evident that all the moving parts are completely counterbalanced. When the mechanism connecting the reciprocating and revolving parts takes the form of the slotted link, (or its practical equivalent, a very long connecting-rod,) this complete counterbalancing may always be accomplished, and when a short connecting-rod or other device is used the counterbalancing may be made very nearly complete, only departing from the ideal case by as much as the motion of the reciprocating parts depart from pure harmonic motion.

The arrangement described is very simple and is completely free of complicated parts or uncertain mechanical devices, and the arrangement may be readily applied to existing machines with very little modification of their structure and to new machines without the necessity of redesigning them. It has been assumed that the reciprocating parts move horizontally. Of course they may move vertically, as in a marine engine, or at any angle.

I do not limit myself to the application of the device to any particular machine, as the device can be readily applied to engines of all kinds, locomotives, pumps, vehicles, motors, &c.

Having thus fully described my invention, I claim as new and desire to secure by Letters Patent—

1. In a machine, the combination with reciprocating and revolving parts, of counterbalancing-bodies, and connections by which said bodies are caused to revolve in unison with the revolving parts and in opposite directions to each other.

2. In a machine, the combination with reciprocating and revolving parts, of counterbalancing-bodies, and connections by which said bodies are caused to revolve in unison with the revolving parts and in opposite directions to each other, in planes parallel with the line of reciprocating motion, so that their motion as regards the line of reciprocating motion shall be in the opposite direction to that of the reciprocating parts.

3. In a machine, the combination with reciprocating and revolving parts, of counterbalancing-bodies, and connections by which said bodies are caused to revolve in unison with the revolving parts and in opposite directions to each other, in planes parallel with the line of reciprocating motion, so that their motion as regards the line of reciprocating motion shall be in the opposite direction to that of the reciprocating parts, said counterbalancing-bodies being of such masses, and so disposed as to counterbalance each other in a vertical direction.

4. In a machine, the combination with reciprocating and revolving parts, of counterbalancing-bodies, and connections by which said bodies are caused to revolve in unison with the revolving parts and in opposite directions to each other, in planes parallel with the line of reciprocating motion, so that their motion as regards the line of reciprocating motion shall be in the opposite direction to that of the reciprocating parts, said counterbalancing-bodies being of such masses, and so disposed, as to counterbalance each other in a vertical direction, and of such aggregate mass, as to counterbalance the reciprocating parts in the line of their motion.

5. In a machine, the combination with reciprocating and revolving parts, of counterbalancing-bodies, and connections by which said bodies are caused to revolve in unison with the revolving parts and in opposite directions to each other, in planes parallel with the line of reciprocating motion, so that their motion as regards the line of reciprocating motion shall be in the opposite direction to that of the reciprocating parts, said counterbalancing-bodies being of such masses, and so disposed, as to counterbalance each other in a vertical direction, and of such aggregate mass, as to counterbalance the reciprocating parts in the line of their motion, and also, to counterbalance any attached rotating parts.

In testimony whereof I have signed my name to this specification in the presence of two subscribing witnesses.

ROBERT EDGAR FORD.

Witnesses:
 W. K. GAYLORD,
 C. H. WRIGHT.